United States Patent [19]

Yano

[11] Patent Number: 4,624,385
[45] Date of Patent: Nov. 25, 1986

[54] ACTUATING DEVICE FOR THE CAP OF A SPOUT OF A WHISTLING KETTLE

[75] Inventor: Hiroshi Yano, Tokyo, Japan

[73] Assignee: Hokusei Nikkei Household Utensils Co., Ltd., Toyama, Japan

[21] Appl. No.: 808,258

[22] Filed: Dec. 12, 1985

[51] Int. Cl.4 .......................................... B65D 43/26
[52] U.S. Cl. .................................. 220/264; 220/263; 220/335; 222/469
[58] Field of Search .............. 220/263, 264, 318, 335; 222/469

[56] References Cited

U.S. PATENT DOCUMENTS

| | | | |
|---|---|---|---|
| 2,014,582 | 9/1935 | Putz | 220/264 |
| 2,574,876 | 11/1951 | Lelus | 222/469 |
| 2,638,253 | 5/1953 | Mueller | 220/335 |
| 2,748,997 | 6/1956 | Richmond, Sr. | 220/263 |
| 3,851,791 | 12/1974 | Flider | 220/263 |

Primary Examiner—George T. Hall
Attorney, Agent, or Firm—Finnegan, Henderson, Farabow, Garrett & Dunner

[57] ABSTRACT

An actuating device for opening and closing a whistling cap of a whistling kettle, wherein the whistling cap is rotatably mounted on the spout by means of a first pivot, comprising an actuating rod which is rotatably mounted on the whistling cap by means of a second pivot, and a spring for continuously biasing the cap into a closed position. The actuating rod has a longitudinal axis which extends in a direction at an obtuse angle $\theta$ with respect to a line connecting the first and second pivots in the closed position of the whistling cap. The actuating rod can move into a locked position past a dead point at which the longitudinal axis of the rod and the first and second pivots are aligned on a same line when the rod is moved to open the whistling cap.

6 Claims, 5 Drawing Figures

ACTUATING DEVICE FOR THE CAP OF A SPOUT OF A WHISTLING KETTLE

BACKGROUND OF THE INVENTION

1. Field of the Invention

The present invention relates to a whistling kettle, and more particularly, to an actuating device for a cap of a spout of the kettle.

2. Description of the Related Art

A whistling kettle which issues a warning sound to indicate that the water in the kettle is boiling is known. There are mainly two types of mechanisms employed for issuing the warning sound, one utilizing an air current and the other a reed type. In the former, the sound is created when the steam passes through a center throughhole formed in a hollow disc plate. In the latter, the sound is created by the vibration of a piece of plate through which the steam passes. In both cases, it is necessary to provide a cap, such as a hollow disc plate or the piece of plate mentioned above, in order to close the spout of the kettle. The cap is usually pivotably mounted on the spout and opened and closed by means of a finger member connected to the cap. In this actuation mechanism, it is difficult for a user to open the cap and pour out the boiled water in the kettle with only one hand at substantially one and the same time.

Furthermore, a locking device is usually provided to keep the cap in an open position. However, in the prior art, it is also difficult for a user to simply effect the opening and locking operations of the cap at one and the same time with only one hand.

The primary object of the present invention is, therefore, to provide a simple and easily operable actuating device for a cap of a spout of a whistling kettle, which device is free from the aforementioned drawbacks.

SUMMARY OF THE INVENTION

In order to achieve the object mentioned above, according to the present invention, there is provided an actuating device for opening and closing a whistling cap of a whistling kettle, wherein the whistling cap is rotatably mounted on the spout by means of a first pivot, comprising an actuating rod which is rotatably mounted on the whistling cap by means of a second pivot, and means for continuously biasing the cap into a closed position, the actuating rod having a longitudinal axis which extends in a direction at an obtuse angle $\theta$ with respect to a line connecting the first and second pivots when the whistling cap is in the closed position, the actuating rod being capable of moving into a locked position past a dead point in which the longitudinal axis of the actuating rod and the first and second pivots are aligned on a same line when the actuating rod is moved to open the whistling cap.

DESCRIPTION OF THE PREFERRED EMBODIMENT

Figure 5:
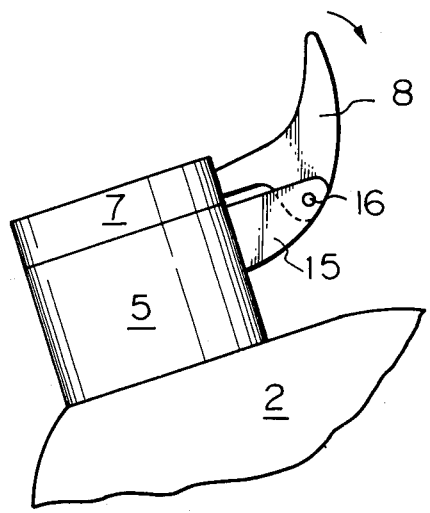

First the prior art will be discussed with reference to FIG. 5. In FIG. 5, a cap of a spout 5 of a whistling kettle 2 has a finger member 8 integrally connected to the cap 7 and rotatably connected to a bracket 15 integral with the spout 5 through a pivot pin 16. When the finger member 8 is rotated in the clockwise direction, as designated by an arrow, about the pin 16, the cap 7 is brought to an open position. When the user pours out the water in the kettle, the user must first open the cap prior to pouring. Since the finger member is located far from a handle 1 (similar to that shown in FIG. 1) of the kettle, the user cannot open the cap 7 and grasp the handle to pour the water at one and the same time with only one hand. After pouring, the user must operate the cap 7 by moving the finger member 8 in the reverse direction. Namely, it is extremely difficult for the user to pour the water and actuate the cap at one and the same time with only one hand.

Alternatively, it is also known to provide a longer finger member extending as far as the vicinity of the handle 1, so that the finger member can be actuated by a forefinger or thumb of the user's hand while grasping the handle with the same hand. However, in this alternative, the cap must be opened and closed each time by the thumb or forefinger. In particular, the user finds it difficult to close the cap, since the user must apply a reverse force to the finger member.

Figure 1:
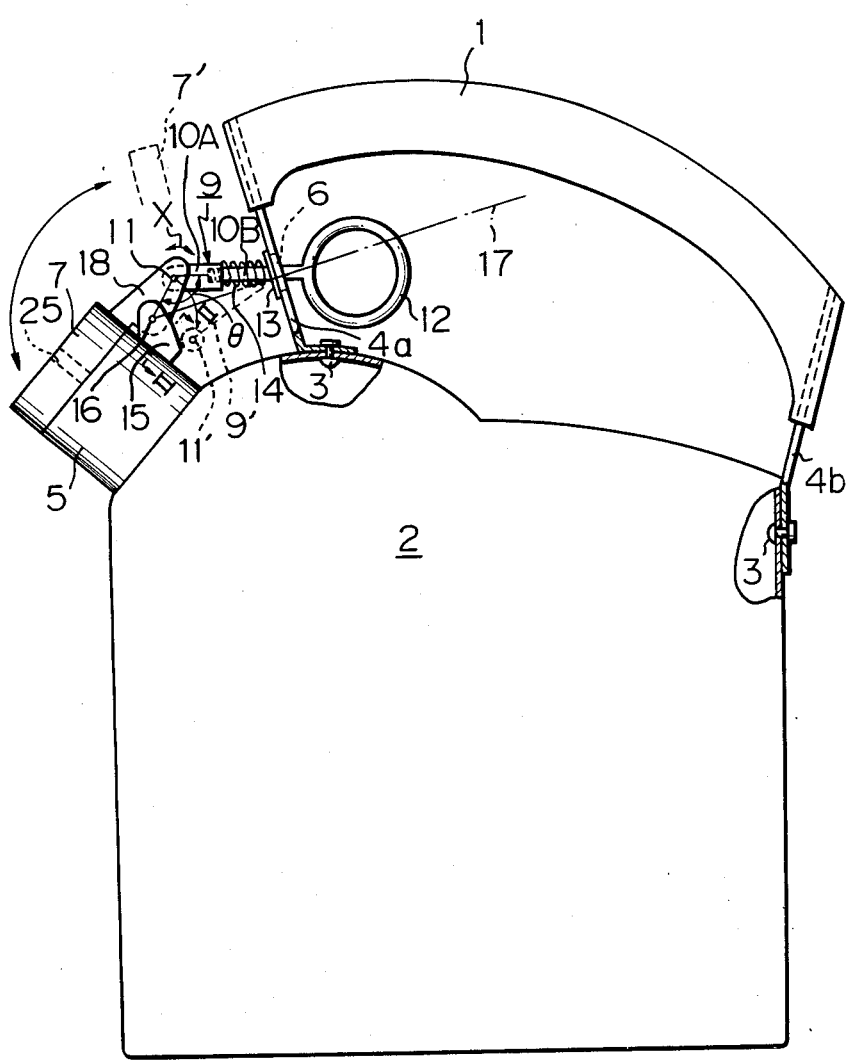
FIG. 1 is a partially sectioned side elevational view of an actuating device of a cap of a spout of a whistling kettle according to the present invention.
Figure 2:
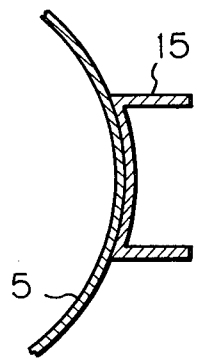
FIG. 2 is a sectional view taken along the line II13 II in FIG. 1.
Figure 3:
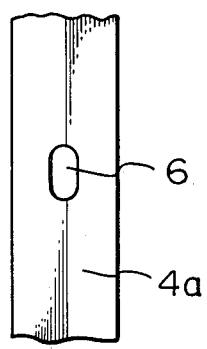
FIG. 3 is an enlarged front elevational view of a handle support shown in FIG. 1.
Figure 4:
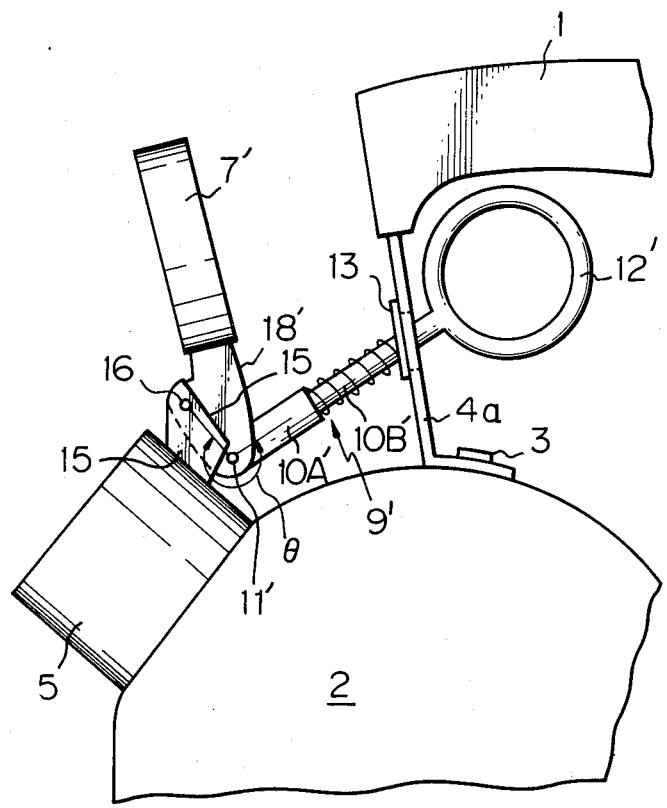
FIG. 4 is a view similar to FIG. 1, but showing the open and locked position of the cap; and, FIG. 5 is a partial view of a cap actuating device of the prior art.

FIGS. 2 to 4 show an embodiment of the present invention. In FIG. 1, the handle 1 of the whistling kettle 2 is made of for example, hard synthetic resin, and is connected at its front and rear ends to handle supports 4a and 4b which are, in turn, connected to the upper and side surfaces of the kettle 2 by means of rivets 3 or the like, respectively. The front handle support 4a adjacent to a spout 5 has an elongated hole 6 through which an actuation rod 9 is extended, as shown in FIG. 3 and as will be described hereinafter. The handle supports 4a and 4b can be made of an elongated piece of stainless plate or aluminum plate.

The cap 7 covers and closes the spout 5 of the kettle 2 and has a usual whistling mechanism in which a small hole 25 is pierced in the cap 7, so that the cap 7 issues a warning sound to indicate that the water in the kettle is boiling when the steam passes through the small hole 25, as is well known. The cap has a cylindrical body which is provided, on the surface facing the front handle support 4a, with an arm 18 made of, for example, aluminum, which is secured thereto by, for example, a known spot welding process. The arm 18 has, for example, a generally U-shaped cross section and is adapted to open and close the cap 7. The actuation rod 9, which extends through the elongated opening 6 of the front handle support 4a as mentioned above, is rotatably mounted on the outer end of the arm 18 by means of a second pivot pin 11, so that the arm 18 can rotate in the directions X about the pin 11. The rod 9 has an angle bar portion 10A and a round bar portion 10B which is threadingly engaged with the angle bar portion 10A. The angle bar portion 10A is located inside the U-shaped arm 18 and connected thereto by means of the pin 11. The rear, i.e., outer, end of the round bar portion 10B is provided with a ring 12 integral therewith which is adapted to be engaged by a finger of a user. Namely, the user inserts and engages a finger, for example, the forefinger, in the ring 12 to move the actuation rod 9 and thus open and close the cap 7. A return compression coil spring 14 is provided around the round bar portion 10B of the rod 9 between the end of the angle bar portion 10A and a seating plate 13 attached to the front handle support 4a.

A small bracket 15 is secured to the outer surface of the spout 5 facing the handle support 4a by, for example, spot welding or the like. The arm 18 of the cap 7 is rotatably mounted, at the lower portion thereof adjacent to the connection between the arm 18 and the cap 7, to the upper portion of the braket 15 by means of a first pivot pin 16. The location of the first pin 16 is preferably in the vicinity of the cap 7 and as close as possible thereto, to prevent lateral movement or swing of the cap 7 while opening or closing operation the cap 7.

As can be seen from FIG. 1, a line connecting the axes of the first and second pins 16 and 11 defines an obtuse angle $\theta$ of approximately 120°, with respect to the longitudinal axis of the rod 9, when the cap 7 is in the closed position.

FIG. 2 shows how the generally U-shaped small bracket 15 is welded to the outer surface of the spout 5. The arm 18 also can be welded to the outer surface of the cap 7, in the same way.

The operation of the device of the present invention is described as follows.

When the kettle issues a warning whistle, the user grasps the handle 1 and at the same time pulls on the ring 12 with the forefinger of that hand to move the rod 9 and open the cap 7. Thus, the user can open the cap 7 while grasping the handle 1 of the kettle 2 with only one hand. When the rod 9 is moved by the user through the ring 12, the arm 18 rotates about the first pin 16 in the clockwise direction in FIG. 1. This rotation of the arm causes the second pin 11 to move in an arc about the first pin 16 in the same direction, so that the second pin 11 reaches a so-called dead point or change point in which the second pin 11, the first pin 16, and the longitudinal axis of the rod 9 are all aligned on a same line 17 (FIG. 1). Namely, at an angle $\theta$ of 180°. A further slight pull on the ring 12, or a slight rotation of the ring 12 in the counterclockwise direction about the pin 11, brings the arm 18 easily to a stable locked position, as shown in FIG. 4, from the unstable so-called dead point mentioned above. FIG. 4 shows the cap 7 in the locked position. In the figure, the components are designated by the corresponding numerals shown in FIG. 1, with the addition of a prime mark (e.g. 11', 10A', 9', etc.). As can be seen in FIG. 4, the cap 7 is brought to the locked position as an extension of the actuation movement for opening the cap 7. After pouring is finished, the cap 7 can be returned to the closed position by reversing the operations mentioned above.

Preferably, the second pin 11 is located above the line 17 representing the dead point when the cap 7 is in the closed position, so that the force of the spring 14 acts on the cap 7 through the arm 18 to continuously bias the cap 7 toward the closed position. Namely, the arm 18 can be easily and automatically returned to its initial position corresponding to the closed position of the cap 7 by the spring 14 when the ring 12 is pulled against the spring 14 to the dead point mentioned above, and when the ring 12 is slightly rotated about the pin 11 in the clockwise direction past the dead point mentioned above.

As can be understood from the above description, the elongated opening 6 formed in the handle support 4a (FIG. 3) permits the rod 9 to move between the cap closed position shown in FIG. 1 and the cap open and locked position shown in FIG. 4.

In the locked position shown in FIG. 4, the angle $\theta$ is approximately 270° ($\theta \approx 270°$). However, theoretically, the cap can be stably maintained in the locked position so long as the angle $\theta$ is more than 180° ($\theta > 180°$). The angle $\theta$ can be calculated according to the locations of the pins 11 and 16, or the shape of the arm 18, etc.

As can be seen from the above description, according to the present invention, the cap of the spout can be easily opened and closed by a finger of one hand while holding the handle of the kettle with the same hand, without displacement of the hand on the handle of the kettle. After the arm connected to the cap passes the dead point, the cap can be locked in the open position by the spring even when the external force applied by the hand is released. When pouring is finished, the cap can be easily closed again at one touch. In addition, according to the present invention, since the spring force continuously biases the cap toward the closed position, the cap remains in the closed position even when steam pressure is applied to the cap, resulting in the prevention of leakage of the steam through the cap, and thus ensuring the issuance of an effective warning sound to indicate that the water in the kettle is boiling.

I claim:

1. An actuating device for opening and closing a whistling cap of a whistling kettle, wherein the whistling cap is rotatably mounted on the spout by means of a first pivot, comprising an actuating rod which is rotatably mounted on the whistling cap by means of a second pivot, and means for continuously biasing the cap into a closed position, said actuating rod having a longitudinal axis which extends in a direction at an obtuse angle $\theta$ with respect to a line connecting the first and second pivots in the closed position of the whistling cap, said actuating rod being capable of moving into a locked position past a dead point at which the longitudinal axis of the rod and the first and second pivots are aligned on a same line when the rod is moved to open the whistling cap.

2. An actuating device according to claim 1, wherein said actuating rod has at an end of the rod far from the second pivot, a hook member in which a finger of a user of the kettle can be engaged.

3. An actuating device according to claim 1, wherein said biasing means comprises a coil spring wound around the actuating rod.

4. An actuating device for opening and closing a whistling cap of a spout of a whistling kettle, comprising an arm integral with the cap and a bracket integral with the spout, said arm being rotatably connected to the bracket by means of a first pivot, a support integrally connected to the whistling kettle, an actuating rod which is movably supported by the support and which is rotatably connected at its one end to the arm by means of a second pivot, and spring means for continuously biasing the cap into a closed position, said actuating rod having a longitudinal axis which extends in a direction defining an obtuse angle $\theta$ with respect to a line connecting the first and second pivots in the closed position of the cap, said cap being locked in an open position when said actuating rod is moved substantially in the direction of the longitudinal axis thereof against the spring means past a dead point at which the longitudinal axis of the rod and the first and second pivots are all aligned on a same line.

5. An actuating device according to claim 4, wherein said support comprises a supporting plate which is integrally connected to the kettle and which has an elongated opening through which the actuating rod extends.

6. An actuating device according to claim 1, wherein said obtuse angle $\theta$ is approximately 120° when the cap is in the closed position.

* * * * *